Nov. 13, 1934.    F. K. SIMONS    1,980,933
COUPLING
Filed Oct. 25, 1932

Inventor:
Frank K. Simons
by his Attorneys
Howson & Howson

Patented Nov. 13, 1934

1,980,933

UNITED STATES PATENT OFFICE 1,980,933

COUPLING

Frank K. Simons, St. Davids, Pa., assignor to Continental-Diamond Fibre Company, Newark, Del., a corporation of Delaware Application October 25, 1932, Serial No. 639,526

2 Claims. (Cl. 64—92)

This invention relates to coupling devices and has for its principal object the provision of a simple, strong, durable and efficient shaft coupling which may be manufactured commercially at low cost.

Heretofore, couplings have been made of a plurality of rigid parts, usually of metal, and, as a result, such devices have not had the degree of flexibility which is very desirable and exceedingly important in many instances, as, for example, where the coupled shafts are slightly misaligned or become misaligned. It is an object of the present invention to provide a coupling, one part of which has its body formed entirely of non-metallic material, the coupling being characterized by sufficient flexibility to compensate for misalignment of the shafts.

A more specific object of the invention is to provide a coupling device, one part of which comprises a recessed member formed entirely of fibrous material and an associated binder, preferably of phenolic resin-impregnated fibrous pieces, and the other part of which is a metallic member extending into said recessed member, said members having interlocking surfaces.

These and other objects, as well as numerous advantages of the device, will be more specifically set forth hereinafter. Reference is now made to the accompanying drawing, in which:—

Figure 1:
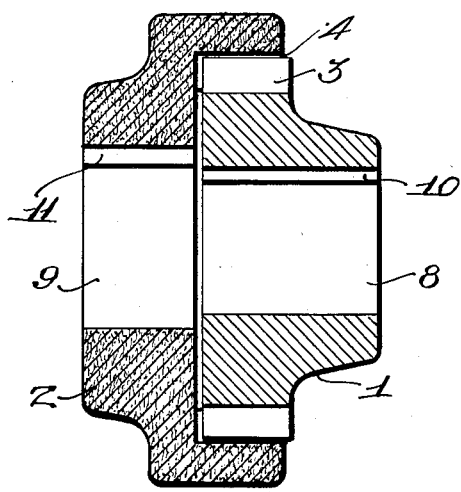
Fig. 1 is a sectional view of a preferred form of the device.
Figure 2:
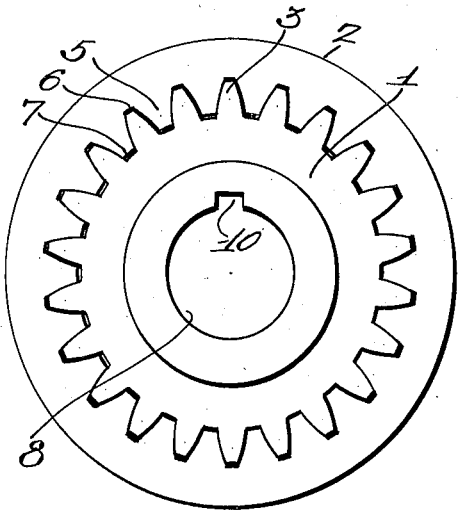
Fig. 2 is a face view of the device.

Referring particularly to Figs. 1 and 2 of the drawing, there is shown a coupling device constructed in accordance with the teachings of the invention, which device comprises a metallic part 1 and a non-metallic part 2. The metallic part may be formed of any suitable metal or other rigid material having the necessary strength and durability. The non-metallic part may be formed of any suitable material having the desired strength, but is preferably formed of fibrous material and an associated binder. Preferably, part 2 is formed of small irregular pieces of fibrous material, such as paper, cloth, and the like, impregnated with synthetic resin of the phenolic type and known in the art as mascerated resin-impregnated fibrous material. The phenolic resins, as is well known, exist in either of two stages, viz., an initial stage and a final stage. In its final stage, it is hard, infusible, and insoluble in water, oil, and the usual organic solvents. The fibrous material may be impregnated with the resin in its initial stage in which it is both fusible and soluble in accordance with any of the known methods either in sheet form, in which case the sheet material is cut to the desired size or in the form of small irregular pieces. The resin-impregnated scrap material resulting from the manufacture of other articles is especially applicable for use. The resin-impregnated mass may then be molded under heat and pressure to form the desired part of the coupling device and to convert the resin from its initial stage to its final, infusible, insoluble stage.

Although it is preferred to form the non-metallic part of the specific materials above set forth, it is to be understood that the invention is not thus limited. The fibrous material may take the form of laminations or any other suitable form. Moreover, any thermo-setting binder may be associated with the fibrous material.

The metallic part 1 is provided with external teeth 3, which, in the present instance, extend entirely about the circumference of the part. The non-metallic part 2 is formed to provide a recess 4 which is adapted to receive the toothed portion of part 1. Part 2 is formed to provide internal teeth 5 which may be welded therein and which are adapted to mesh with the teeth 3 of part 1, as clearly illustrated. It will be noted that the teeth of the two members mesh snugly so that there is no appreciable lost rotary motion between the members. The members are so formed, however, that there are small spaces 6 and 7 at the ends of the teeth, which spaces allow slight transverse movement of the coupling members with respect to each other and thus impart flexibility to the device. The two parts are provided with central openings 8 and 9, respectively, for receiving the shafts to be coupled and keyways 10 and 11 are provided to permit the secure locking of the parts upon the respective shafts.

It will be noted that in this instance, the non-metallic part 2 is formed entirely of the non-metallic material above specified. If desired, a metallic hub or bushing may be provided on part 2, as will be more clearly apparent from the following description of Figs. 3 and 4. By virtue of the resiliency of the non-metallic part 2 and the small spaces 6 and 7, above mentioned, the device has the desired degree of flexibility which is necessary in coupling devices, especially where the coupled shafts are slightly misaligned or have a tendency to become so. The non-metallic material is, however, very strong, rigid, and durable, its resiliency being appreciable only as compared with metal. The provision of teeth extending entirely about the device causes a uniform distribution of the stresses and, therefore, lessens the tendency of any particular part to wear excessively. The teeth may be formed on the non-metallic part with the same accuracy as a machined part but at a much lower cost. The number of teeth also gives great driving strength, especially for small diameter devices.

Figure 3:
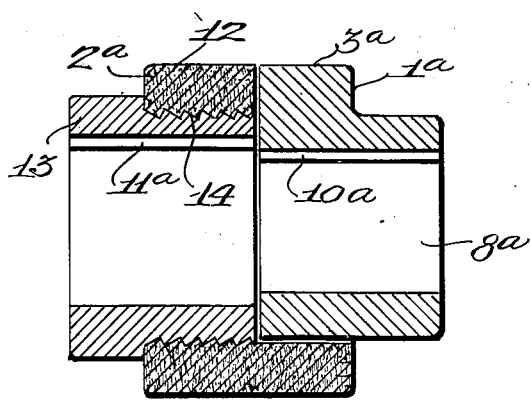
Fig. 3 is a sectional view of a modified form of the device.
Figure 4:
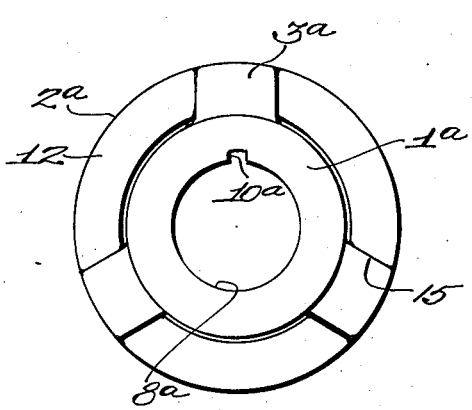
Fig. 4 is a face view of the modified device.

In Figs. 3 and 4, there is illustrated a modified form of coupling device which comprises a metallic part 1a and a part 2a whose body is formed entirely of non-metallic material, such as above mentioned, and preferably molded synthetic resin-impregnated fibrous pieces. The body 12 of part 2a is molded or otherwise formed about the metallic hub or bushing 13. The hub is provided with annular serrations 14 to insure locking of the non-metallic body thereto.

Instead of having teeth extending entirely about the device, as in the preferred form, the metallic part 1a is provided with three teeth 3a and the non-metallic body of part 2a is provided with recesses 15 which are adapted to snugly receive teeth 3a. The non-metallic body is recessed as before to receive the metallic part and teeth 3a extend through the radial recesses 15 to the peripheral surface of the device. This form of the device has many of the advantages of the preferred form, especially the desired flexibility and requisite strength. In this case, however, the stresses are not uniformly distributed and the device is not as strong as the preferred form nor is it intended to be, it being understood that this form of the device will be used in instances where great strength is not required. It will also be understood, of course, that the number of teeth 3a is not limited to the number shown but any desired number of teeth may be provided. Although the metallic hub 13 is illustrated in the modified form and has been omitted from the preferred form, it is to be understood that this feature may be used in either form of the device as desired.

Regarding the device of the invention generally, and especially the preferred form of the device, there are numerous advantages attending the construction herein contemplated. The combination of resin-impregnated fibrous material and metal makes a very good bearing and at the same time provides a flexible device which will compensate for misalignment of the coupled shafts as above noted. The use of non-metallic material to form the body of one of the coupling parts also eliminates the clatter or noise that is very noticeable in coupling devices having metallic parts in contact. Another advantage of the device is that it may be made at low cost as compared with any other prior couplings having the same driving power. Another advantage of the device is the lightness in weight due to the use of the fibrous material which is lighter in weight than metal.

A coupling formed in accordance with the invention is very durable and will resist the deleterious effects of water, acids, oils, etc. Such a coupling will also withstand high temperatures. It has been found that temperatures at least as high as 290° F. will be satisfactorily withstood. The coupling, and especially the non-metallic part, has a relatively long life. In fact, during actual use of such a coupling, the non-metallic part has outworn the metallic part.

The device is, of course, applicable in any instance where it is desired to connect two units. It may be run dry or in water, or any form of lubricant, as the particular instance requires. Another important advantage of the device is that, due to the insulating character of the non-metallic material, it may be used in instances where the flow of electric currents from one unit or shaft to another is encountered.

Although two forms of the device have been illustrated herein for the purpose of disclosure, it will be understood that the invention will not be limited to these forms but may be practiced in other modified forms. For example, a three part coupling in which is employed a recessed member formed entirely of non-metallic material and a metallic member extending into said recessed member, said members having interlocking surfaces is disclosed and specifically claimed in my co-pending application Serial No. 639,525, filed even date herewith.

I claim:

1. A two-part coupling comprising solely a non-metallic part and a metallic part, each adapted for direct attachment to a power transmitting shaft, said non-metallic part comprising a unitary rigid body which is socket shaped to receive snugly the metallic part, the socket having a peripheral wall of dentate formation, and the metallic part having a peripheral dentated portion adapted for interdentate association with the said socket wall.

2. A two-part coupling comprising solely a non-metallic part and a metallic part, each adapted for direct attachment to a power transmitting shaft, said non-metallic part comprising a unitary rigid body composed of small fibrous pieces and an associated binder which is socket shaped to receive snugly the metallic part, the socket having a peripheral wall of dentate formation, and the metallic part having a peripheral dentated portion adapted for interdentate association with the said socket wall.

FRANK K. SIMONS.